United States Patent
Cheadle et al.

(10) Patent No.: US 9,326,251 B2
(45) Date of Patent: Apr. 26, 2016

(54) SUPPLEMENTAL MAXIMUM POWER REDUCTION FOR OPERATION IN RESTRICTED CONFIGURATIONS

(71) Applicant: QUALCOMM Incorporated, San Diego, CA (US)

(72) Inventors: Benjamin Cheadle, San Diego, CA (US); Sumit Verma, San Diego, CA (US); Gene Fong, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 14/500,955

(22) Filed: Sep. 29, 2014

(65) Prior Publication Data
US 2015/0094078 A1    Apr. 2, 2015

Related U.S. Application Data

(60) Provisional application No. 61/884,973, filed on Sep. 30, 2013.

(51) Int. Cl.
*H04W 72/00* (2009.01)
*H04W 52/14* (2009.01)
*H04W 52/24* (2009.01)
*H04W 72/04* (2009.01)
*H04W 52/36* (2009.01)
*H04W 88/02* (2009.01)

(52) U.S. Cl.
CPC .......... *H04W 52/146* (2013.01); *H04W 52/243* (2013.01); *H04W 52/248* (2013.01); *H04W 52/367* (2013.01); *H04W 72/042* (2013.01); *H04W 72/0413* (2013.01); *H04W 88/02* (2013.01); *Y02B 60/50* (2013.01)

(58) Field of Classification Search
CPC ..... H04W 72/04; H04W 16/12; H04W 24/00; H04W 52/24
USPC .................... 455/450, 451, 452.1, 452.2, 522
See application file for complete search history.

(56) References Cited

U.S. PATENT DOCUMENTS

| | | | |
|---|---|---|---|
| 2006/0045046 A1* | 3/2006 | Kim ..................... | H04W 52/146 370/329 |
| 2006/0105774 A1* | 5/2006 | Ranta-Aho ............. | H04L 47/10 455/453 |
| 2007/0140289 A1* | 6/2007 | Tellado ................. | H04B 1/0475 370/445 |

(Continued)

FOREIGN PATENT DOCUMENTS

WO    2012173057 A1    12/2012

OTHER PUBLICATIONS

International Search Report and Written Opinion—PCT/US2014/058348—ISA/EPO—Dec. 22, 2014.

(Continued)

*Primary Examiner* — Olumide T Ajibade Akonai
*Assistant Examiner* — Matthew Genack
(74) *Attorney, Agent, or Firm* — Fountainhead Law Group P.C.

(57) ABSTRACT

In one embodiment, the present disclosure includes a method for reducing out of band emissions. In one embodiment, the method comprises receiving a network signal value from a network, and reducing a transmission signal power on the basis of the network signal value, a center frequency of a transmitting channel, a number of allocated resource blocks, and a location of the allocated resource blocks within the channel.

21 Claims, 5 Drawing Sheets

(56) References Cited

U.S. PATENT DOCUMENTS

| | | | |
|---|---|---|---|
| 2010/0169733 A1* | 7/2010 | Kim | H04L 1/1671 714/748 |
| 2011/0319119 A1 | 12/2011 | Ishii | |
| 2013/0010720 A1* | 1/2013 | Lohr | H04L 1/0026 370/329 |
| 2013/0182663 A1 | 7/2013 | Ji et al. | |
| 2014/0105118 A1* | 4/2014 | Senarath | H04W 72/1231 370/329 |
| 2014/0148212 A1* | 5/2014 | Gusavac | H04W 52/143 455/522 |

OTHER PUBLICATIONS

"3GPP Long Term Evolution: System Overview, Product Development, and Test Challenges", Agilent Technologies, Sep. 8, 2009, pp. 1-92.

ETSI TS 136 101 V8.3.0,"LTE: Evolved Universal Terrestrial Radio Access (E-UTRA), User Equipment (UE) radio transmission and reception", 3GPP TS 36.101, version 8.3.0, Release 8, Nov. 2011, p. 1-86.

"LTW Resource Guide", Anritsu Company, 3GPP, BTS Master/Spectrum Master, Physical Channels and Signals, 2009, pp. 1-18.

Patterson L.,"Conducting Measurements on LTW Transmitters", Evaluation Engineer, Anritsu, Feb. 2009, http://www.evaluationengineering.com/articles/200902/conductingmeasurements-on-lte-transmitters.php, 9 pages.

ETSI TS 136 101 V11.8.0, "LTE: Evolved Universal Terrestrial Radio Access (E-UTRA), User Equipment (UE) radio transmission and reception", ETSI Technical Specification, 3GPP TS 36.101, version 11.8.0, Release 11, Apr. 2014, pp. 1-496.

\* cited by examiner

SUPPLEMENTAL MAXIMUM POWER REDUCTION FOR OPERATION IN RESTRICTED CONFIGURATIONS

CROSS REFERENCE TO RELATED APPLICATIONS

This application claims priority to U.S. Provisional App. No. 61/884,973 filed Sep. 30, 2013, the content of which is incorporated herein by reference in its entirety for all purposes.

BACKGROUND

The present disclosure relates generally to wireless communication systems. More particularly, the present disclosure relates to limiting the maximum output power when a mobile wireless device receives a request to transmit in a restricted configuration.

Wireless communication devices have become smaller and more powerful as well as more capable. Increasingly users rely on wireless communication devices for mobile phone use as well as email and Internet access. At the same time, devices have become smaller in size. Devices such as cellular telephones, personal digital assistants (PDAs), laptop computers, and other similar devices provide reliable service with expanded coverage areas. Such devices may be referred to as mobile stations, stations, access terminals, user terminals, subscriber units, user equipment (UE), and similar terms.

A wireless communication system may support communication for multiple wireless communication devices at the same time. In use, a wireless communication device may communicate with one or more base stations by transmissions on an uplink and downlink. Base stations may be referred to as access points, Node Bs, or other similar terms. The uplink or reverse link refers to the communication link from the wireless communication device to the base station, while the downlink or forward link refers to the communication from the base station to the wireless communication devices.

Wireless communication systems may be multiple access systems capable of supporting communication with multiple users (i.e., with mobile user equipment UE) by sharing the available system resources, such as bandwidth and transmit power. Examples of such multiple access systems include code division multiple access (CDMA) systems, time division multiple access (TDMA) systems, frequency division multiple access (FDMA) systems, wideband code division multiple access (WCDMA) systems, global system for mobile (GSM) communication systems, enhanced data rates for GSM evolution (EDGE) systems, and orthogonal frequency division multiple access (OFDMA) systems.

In order to comply with regulatory requirements regarding the emissions into protected radio spectrum, the 3rd Generation Partnership Project (3GPP) has defined scheduling restrictions to prevent operation in scenarios that would cause the UE to violate spectrum emissions requirements. These restrictions are described in the 3GPP TS 36.101 standard, for example.

The possibility exists that the UE may decode a false grant due to poor channel conditions, and this false grant may cause the UE to transmit in a restricted configuration which could potentially lead to excessive emissions in a protected band. A grant for an uplink (UL) transmission is issued by the network after a request from the UE. The UE may request a permission to upload data to a destination via the network. A request for transmission contains data about the state of the transmission buffer and the queue at the UE and its available power margin. A network based scheduler decides when the UE will be granted permission to transmit. Resources are allocated for permission to be granted for UE transmission. If a grant to activate an uplink transmission is falsely detected, UL transmissions could start erroneously and cause interference. If a message activating an UL is received in error, or when none was transmitted, then various problems may occur, including potentially corrupting other uplink transmissions, giving rise to interference in other transmission channels when the UL power level is too high.

SUMMARY

The following presents a simplified summary of the disclosed aspects in order to provide a basic understanding of such aspects. This summary is not an extensive overview of all contemplated aspects, and is intended to neither identify key or critical elements nor delineate the scope of such aspects.

In one embodiment, the present disclosure includes a method for reducing out of band emissions by limiting a mobile user equipment (UE) transmission power. In one embodiment, the method comprises receiving a network signal value from a network, and reducing a transmission signal power on the basis of the network signal value, a center frequency of a transmitting channel, a number of allocated resource blocks, and a location of the allocated resource blocks within the channel.

In one embodiment, particular resource blocks occupy a span of frequency, and wherein a regional protocol specifies resource blocks that are not usable for corresponding lengths of contiguous allocated resource blocks, and wherein said reducing the transmission signal power occurs when one of said specified resource blocks that are not usable is scheduled for transmission.

In one embodiment, said reducing is triggered by a rule-based decision process.

In one embodiment, said reducing comprises reducing a maximum configured output power limit.

In one embodiment, said reducing the transmission signal power is supplemental to another reduction in transmission signal power, wherein said another reduction in transmission signal power is based on the network signal value but not the location of the allocated resource blocks within the channel.

In one embodiment, said supplemental reducing of the transmission signal power is stored in a non-volatile memory on the UE.

In one embodiment, said supplemental reducing of the transmission signal power is configurable based on characterization measurements of a UE design.

In one embodiment, said supplemental reducing of the transmission signal power is greater than said another reduction in transmission signal power based on the network signal value.

In one embodiment, the UE is configured to transmit resource blocks to a base station in violation of a regional protocol.

In one embodiment, the UE is configured to transmit the resource blocks due to the base station being non-compliant with said regional protocol.

In one embodiment, the UE is configured to transmit the resource blocks due to the UE being non-compliant with said regional protocol.

In one embodiment, the UE is configured to transmit the resource blocks due to a misinterpretation on the UE of a schedule transmitted from the base station to the UE.

In one embodiment, the network signal value is NS_05.

In one embodiment, the UE is operable in a roaming mode to receive the network signal value of NS_05.

In another embodiment, the present disclosure includes a wireless device comprising a transmitter, a receiver, and digital processing circuits configured to receive a network signal value from a base station through the receiver and reduce a transmission signal power in the transmitter on the basis of the network signal value, a center frequency of a transmitting channel, a number of allocated resource blocks, and a location of the allocated resource blocks within the channel.

In another embodiment, the present disclosure includes a software program stored on a non-volatile storage medium, when executed on a computing machine of a mobile user equipment (UE), performs the steps for limiting UE transmission power comprising receiving a network signal value from a network, and reducing a transmission signal power on the basis of the network signal value, a center frequency of a transmitting channel, a number of allocated resource blocks, and a location of the allocated resource blocks within the channel.

The following detailed description and accompanying drawings provide a better understanding of the nature and advantages of the present disclosure.

DETAILED DESCRIPTION

The present disclosure pertains to power reduction in restricted configurations. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various aspects will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The method of selecting max power back-off based on a combination of network signaling and Tx scheduling is defined in 3GPP as "Additional Max Power Reduction." However, a configuration may arise, such as location and size of an allocation of resource blocks in relation to a protected band, or a false grant due to poor channel conditions, that warrant the UE making a power emission back-off decision that is supplemental to the transmission grant.

For example, in order to address UE emissions into Japan's protected PHS band, the LTE standard recommends a network-side solution of restricting known problematic configurations (e.g. based on carrier center frequency Fc, starting resource block RBstart, and length of a contiguous resource block allocation Lcrb). Based on these 3GPP definitions, the UE compliance is dependent on network compliance. Scheduling restrictions may be satisfactory for general operational purposes, but they may not be sufficient to meet regulatory requirements where the regulator needs to ensure that the UE cannot exceed emission requirements for all possibilities of operational scenarios.

If, for example, channel conditions are poor (e.g., the bit error rate temporarily is greater than an acceptable threshold) the UE may receive and decode what turns out to be a false grant to transmit in a configuration that is not acceptable.

In view of at least the above there is a need for a solution for the UE to guard against false grants or non-compliant network operation by taking UE-side steps to limit transmission power based on additional criteria beyond the standard transmission grant conditions.

The disclosed apparatus and methods may use an indicator value received via a signal from the network to enable/disable a supplementary back-off feature. That is, in addition to restrictions provided by the network on UE power transmissions, the UE may take additional (possibly unilateral) precautions. These precautions may include: If the indicator is signaled, the UE will take additional max power reduction if asked to operate in a particular mode (e.g., a mode declared invalid according to 3GPP). The maximum power reduction may be configurable based on characterization measurements on a particular design, for example, and stored in the UE's non-volatile memory. In one example application, a supplemental back-off that reduces a transmission signal power is supplemental to another reduction in transmission signal power based on a network signal value but not the location of allocated resource blocks within the channel.

Figure 1:
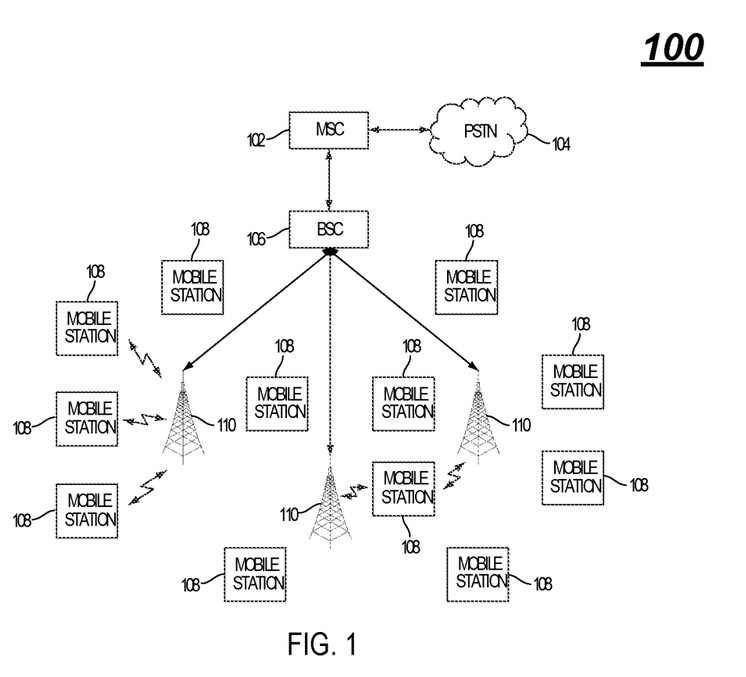
FIG. 1 illustrates a wireless communication system in accordance with various aspects set forth herein.

FIG. 1 illustrates a wireless system that may include a plurality of mobile stations (e.g., user equipment UE) 108, a plurality of base stations 110, a base station controller (BSC) 106, and a mobile switching center (MSC) 102. The system 100 may be GSM, EDGE, WCDMA, CDMA, etc. The MSC 102 may be configured to interface with a public switched telephone network (PTSN) 104. The MSC may also be configured to interface with the BSC 306. There may be more than one BSC 106 in the system 300. Each base station 110 may include at least one sector, where each sector may have an omnidirectional antenna or an antenna pointed in a particular direction radially away from the base stations 110. Alternatively, each sector may include two antennas for diversity reception. Each base station 110 may be designed to support a plurality of frequency assignments. The intersection of a sector and a frequency assignment may be referred to as a channel, for example. Example mobile stations 108 may include cellular or portable communication system (PCS) telephones.

During operation of the cellular telephone system, the base stations 110 may receive sets of reverse link signals from sets of mobile stations 108. The mobile stations 108 may be involved in telephone calls or other communications. Each reverse link signal received by a given base station 110 may be processed within that base station 110. The resulting data may be forwarded to the BSC 106. The BSC 106 may provide call resource allocation and mobility management functionality including the orchestration of soft handoffs between base stations 110. The BSC 106 may also route the received data to the MSC 102, which provides additional routing services for interfacing with the PSTN 104. Similarly, the PTSN 104 may interface with the MSC 102, and the MSC 102 may interface with the BSC 106, which in turn may control the base stations 110 to transmit sets of forward link signals to sets of mobile stations 108.

In order for a UE 108 to meet the emissions requirements without sacrificing performance in unrestricted regions, a UE maximum power reduction method is disclosed which would take effect any time the UE 108 is scheduled in a restricted configuration according to certain rules, for example.

Embodiments disclosed herein provide a general power back-off method as a safeguard against false UL grants or non-compliant network behavior, for example. One embodiment uses an indicator from the network to enable/disable the supplementary back-off feature. If signaled, the UE will take additional max power reduction if asked to operate in a mode declared invalid according to 3GPP, for example.

Figure 2:
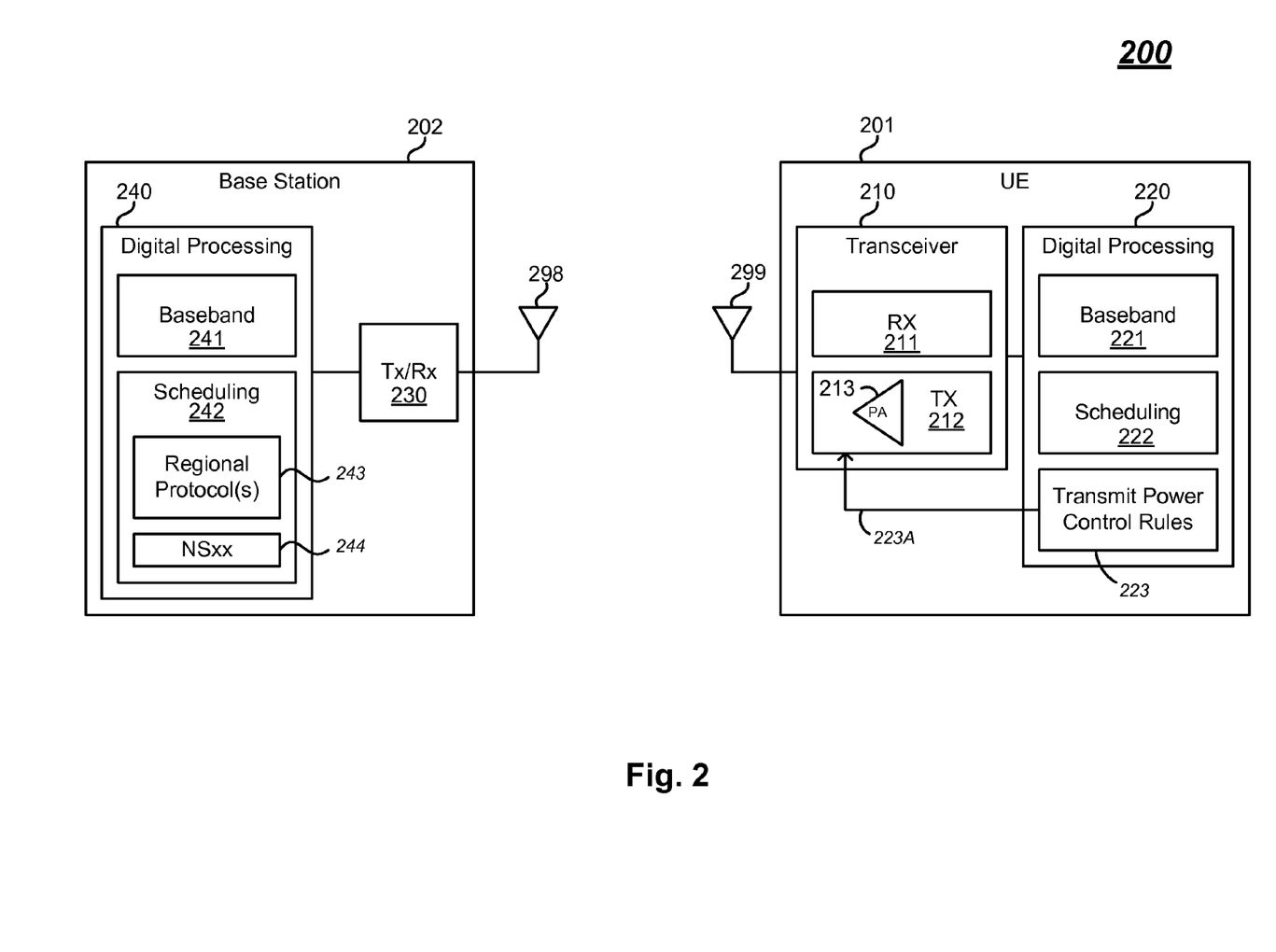
FIG. 2 illustrates a wireless system according to an embodiment.

FIG. 2 illustrates a wireless system according to an embodiment. Wireless system 200 includes a wireless device 201, referred to as user equipment (UE), and a base station 202. Base station 202 and wireless device 201 may be configured to communicate using any one of a number of different wireless protocols. Features and advantages of the present disclosure are described with reference to a particular wireless protocol—$3^{rd}$ Generation Partnership Project (3GPP) (e.g., 3GPP TS 36). However, it is to be understood that the features and approached described herein may be applicable to other wireless communication arrangements. In this example, UE 201 and base station 202 may communicate information using the 3GPP protocol. Base station 202 may include digital processing circuits 240 for configuring information for a wireless channel, including baseband processing 241 for encoding information for transmission. Encoded information from baseband 241 is provided to a transceiver (Tx/RX) 230 which may include a receiver (RX) and a transmitter (TX). A transmitter in transceiver 230 drives RF signals with encoded information to one or more antenna 298. The RF signals produced by antenna 298 are received on one or more antenna 299 on UE 201. A transceiver 210 in UE 201 includes a receiver (RX) 211 for receiving, amplifying, down converting, and digitizing the received RF signals, for example. Digital processing circuits 220 in UE 201 process the received information in the RF signals, including decoding the information in a baseband processor 221. Transmission of information from the base station 202 to UE 201 as described above is referred to as the downlink (DL), for example, and may use Orthogonal Frequency Division Multiplexing (OFDM).

Similarly, digital processing circuits 220 in UE 201 configure information for transmission from UE 201 to base station 202 via a wireless channel. Digital processing 220 may include baseband processing 221 for encoding information for transmission. Encoded information from baseband 221 is provided to a transmitter (TX) 212 in transceiver 210. Transmitter 212 includes an RF power amplifier to drive RF signals with encoded information to one or more antenna 299. The RF signals produced by antenna 299 are received on the one or more base station antenna 298 on base station 202. A transceiver 230 in base station 202 includes a receiver (RX) for receiving, amplifying, down converting, and digitizing the received RF signals, for example. The digital processing circuits 240 in base station 202 process the received information in the RF signals, including decoding the information in the baseband processor 241. Transmission of information from the UE 201 to base station 202 is referred to as the uplink (DL), for example, and may use Single Carrier Frequency Division Multiple Access (SC-FDMA).

As described in more detail below, base station processing 240 may include scheduling 242 according to regional protocols 243. For example, different regions may have region specific constraints that dictate how communications are to be carried out. In particular, base station processing 240 may include a network signal value (NSxx) 244, which may reside on the base station 202 or be sent from other parts of the network to the base station, for example. A network signaling value, NSxx, be a parameter that places restrictions on the UE transmission, for example. The network signaling value may have values associated with particular regions, such as the US, Japan, or other locations. Features and advantages of the present disclosure include using the network signal value 244 to trigger particular operations in the UE 201. For example, in one embodiment, base station scheduling may restrict a particular UE from transmitting RF signals on an uplink at particular frequencies (e.g., adjacent to another frequency channel) due to regional protocols 243. However, in some cases UE 201 may be configured to transmit information to a base station at frequencies that violate the regional protocol restrictions due to a variety of reasons, including the base station being non-compliant with said regional protocol, the UE being non-compliant with said regional protocol, or a misinterpretation on the UE of a schedule transmitted from the base station to the UE, for example.

To solve this problem, certain embodiments of the present disclosure include sending the network signaling value (NSxx) 244 from the base station 202 to the UE 201. In this illustrative example, digital processing 220 in UE 201 includes scheduling process 222 and transmit power control rules 223. Scheduling 222 may configure information for transmission on the uplink according to scheduling criteria (assignments) received from base station 202. However, UE 201 uses the received network signal value 244 to determine (e.g., using transmit power control rules 223) if base station 202 has scheduled transmission on the uplink of information on frequencies that violate regional protocols. If such a violation is detected, then transmit power control rules 223 may cause signals 223A to be sent from digital processing 220, for example, to transmitter 212 to reduce the transmission signal power.

Figure 3:
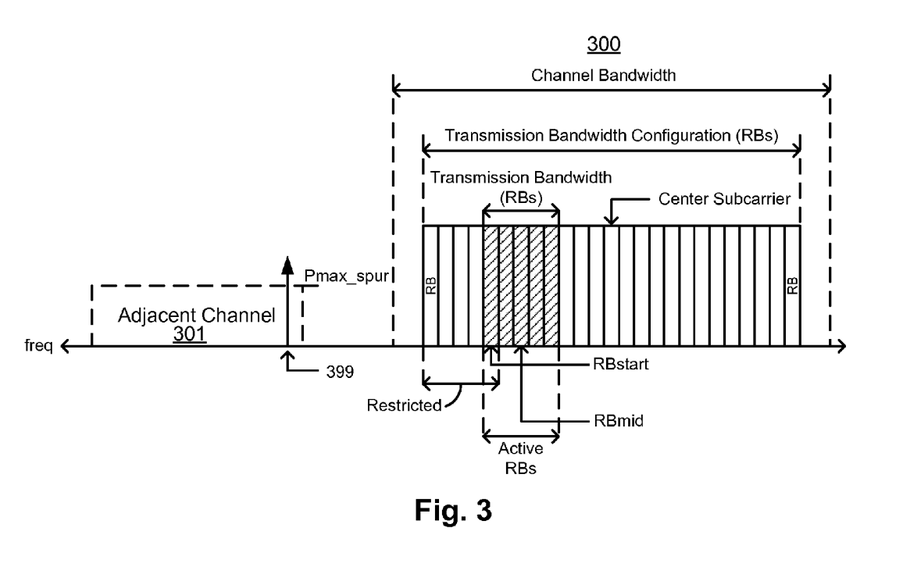
FIG. 3 illustrates an example application of a transmit power reduction technique according to one embodiment.

FIG. 3 illustrates an example application of a transmit power reduction technique according to one embodiment. In this example, two (2) wireless channels are adjacent to each other, and one channel may cause spurious out of band frequency content to be generated in the adjacent channel at impermissible power levels. An uplink channel 300 may be an evolved UMTS Terrestrial Radio Access (E-UTRA) air interface channel, for example, having a channel bandwidth from 1920-1980 MHz. Channel bandwidth may refer to the width of the channel as measured from the lowest channel edge to the highest channel edge, for example. In this example, the channel edge is the center frequency plus/minus the one-half the channel bandwidth (i.e., ±(channel bandwidth/2)). Information may be transmitted from the UE to a base station by sending different portions of the information at different frequencies. In this example, the information to be transmitted via the uplink is arranged in a number of resource blocks. For example, according to one protocol, one (1) resource block is 0.5 ms and contains 12 subcarriers for each symbol in the frequency domain.

As mentioned above, the base station schedules transmission of information on the uplink, and typically coordinates the particular resource blocks used by particular UE's at particular times. Accordingly, one UE may only be scheduled to transmit information in a subset of the available resource blocks, which are the allocated or "active" resource blocks (RBs) shown in FIG. 3. In this example, the UE is scheduled to transmit on five contiguous RBs. The allocated RBs include a starting RB (RBstart) and a midpoint RB (RBmid). The transmission bandwidth is set according to the number of active RBs in a transmission. Accordingly, as the number of allocated RBs increases, the transmission bandwidth increases. The number of RBs, in turn, is related to the length of the contiguous resource blocks (Lcrb). Therefore, as Lcrb increases, the transmission bandwidth increases. A Transmission Bandwidth Configuration is the maximum number of RBs for the particular channel bandwidth. The maximum occupied bandwidth in this example is the number of Resource Blocks multiplied by 180 kHz (e.g., 15 kHz/sub-carrier×12 subcarriers/RB×#RBs).

As illustrated in FIG. 3, regional protocols may set an upper limit on the power of spurious frequency content from one channel (e.g., channel 300) appearing in an adjacent channel 301. In this example, a spur 399 exceeds the maximum allowable spur power, Pmax_spur, set by a particular regional standard. Typically, a base station prevents such non-compliance by restricting the RBs used in the uplink. In this example, the first five (5) RBs from the channel edge are restricted from use in the uplink (e.g., by a scheduler). However, in this example, a UE has transmitted in one of the restricted RBs (e.g., RBstart=5), which causes a violation of Pmax_spur in the adjacent channel. As illustrated above, embodiments of the present disclosure may use the network signal value (NSxx) in the UE to further safeguard against violations of regional protocols. In this example, a UE may determine that one of the allocated RBs is in a restricted RB slot. If such a condition is detected, the UE may reduce transmit power (i.e., "Back Off") across all RBs in a transmission to ensure that regional limits on out of band emissions are met. Accordingly, operation in an additional "Back-Off region" can be achieved without violation of RF emissions requirements. As illustrated below in FIG. 4, it can be seen that RBmid and Lcrb may be used to trigger power reduction in a UE, for example.

Figure 4:
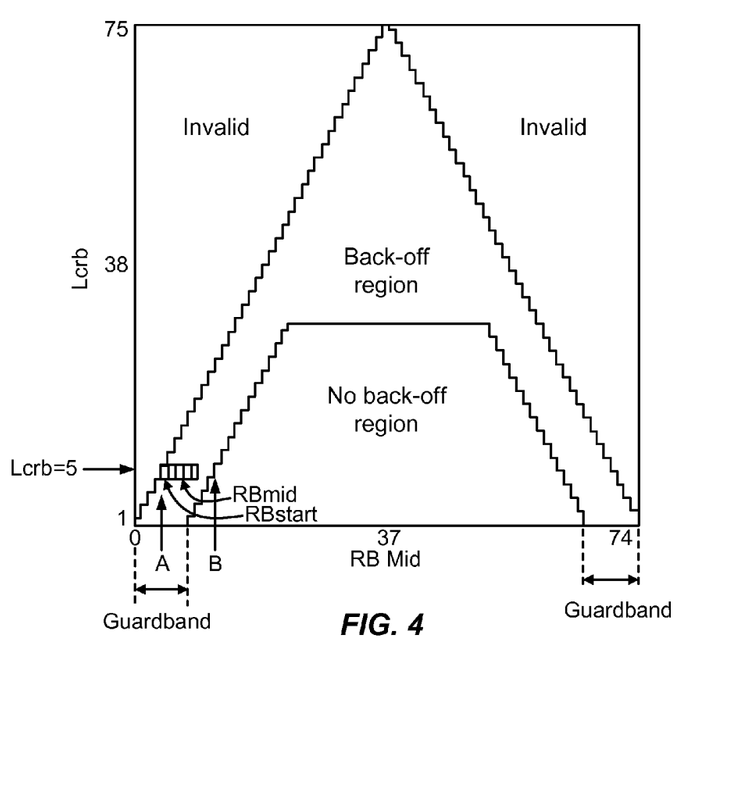
FIG. 4 is a graph illustrating conditions for power emission back-off according to one embodiment.

FIG. 4 is a graph illustrating conditions for power emission back-off according to one embodiment. FIG. 4 may represents LTE 15 MHz operations of a supplemental power reduction system at an uplink center frequency Ful=1932.5 MHz as may be used in a Japanese transmission system where power back-off may be implemented, for example. The 3GPP standard does not define operation in the "invalid" region. Back-off according to a 3GPP standard may allow certain handset implementations to take backoff based on an NSxx value (e.g., a system may take 1 dB for RB allocation greater than 50 blocks for NS05), which may occur in a "No Back Off" region, for example. Embodiments of the disclosure may include supplemental back off for the "Back-off" region in FIG. 4. Power reduction in the Back-off region according to the present disclosure may be greater than other NSxx based backoff that may exist to ensure spur reduction in adjacent bands, for example.

For example, in FIG. 4, a group from among 75 resource blocks (RB) numbered 0-74 may be selected to form an allocated group of contiguous resource blocks (crb) usable by a UE 108 (FIG. 1) for transmission. Each resource block occupies a span of frequency, and the transmission bandwidth is defined by the total bandwidth of the group of active allocated contiguous resource blocks (See FIG. 3). The number of resource blocks (RB) included in the group is Lcrb, and may theoretically be 1-75 in size, however, as the following disclosure illustrates, a practical limit may be imposed on the maximum Lcrb.

In FIG. 4, the horizontal axis represents the numbering of the midpoint resource block (RBmid) of the group of allocated contiguous resource blocks (crb), where each resource block occupies a span of frequency. The allocated resource blocks are located within a Transmission Bandwidth Configuration, i.e., the total frequency range of one Evolved UMTS Terrestrial Radio Access (E-UTRA) carrier. The vertical axis specifies a length of the allocated contiguous resource blocks (Lcrb) (i.e., the number of resource blocks in the contiguous group).

In one embodiment, the condition for which a maximum specified power level is permitted and no back-off is required is indicated when the mid-value resource block is between about 7 and 66, and further depending on how many resource blocks are allocated for the UE 108 to use (e.g., as Lcrb increases, the "No Back Off Region" or range of RBmid values reduces). If the RBmid value is close to about 7, as in the example shown in FIG. 4, any Lcrb larger than one may have an integrated power transmitted by the UE that may result in undesirable levels of emitted signals in neighboring spectra (such as, for example, a PHS band having a upper frequency of about 1915 MHz as used in Japan). If the RBmid value of the transmission bandwidth (e.g., related to the Lcrb) is displaced away from the channel edge of the Transmission Bandwidth Configuration (i.e., away from resource block 7 to a higher number, or less than about resource block 66 to a lower number, then the size of the transmission band (i.e., the number of active resource blocks, as indicated by the value of Lcrb) may be larger and still avoid excessive spectral emission in a protected or adjacent frequency range or another Transmission Bandwidth Configuration channel. That is, the farther from the band edge of the Transmission Bandwidth Configuration, the larger the value of Lcrb (and therefore size of the transmission bandwidth of the Lcrb allocated contiguous resource blocks, and corresponding integrated power emitter) that can still satisfy emission restrictions.

Referring to FIG. 3, five (5) allocated contiguous RBs are shown. Lcrb is equal to 5. RBstart is in the $5^{th}$ RB slot from the edge, which places RBmid at the $7^{th}$ RB slot from the edge. If the regional protocol places a restriction (or guardband) on slots 1-5, then RBmid and Lcrb can be used to determine that RBstart is in a restricted slot, which triggers a transmit power reduction. As shown in FIG. 4, RBmid is inside the guardband (a range of values of RBmid for Lcrb=5 signaling a violation). For no back-off to occur, RBmid must be greater than B (i.e., within the "no back-off region"). It should be noted that the guardband on RBmid in this example, or on RBstart in another embodiment, for example, may be symmetric around the center frequency. As an example, intermodulation distortion may cause violations of the guardband on the far edge of the channel to cause spurs in channels adjacent to a proximate edge of the channel. It should be noted that one advantage of the present technique, as illustrated by the upper portion of FIG. 4, is that very wide bandwidth signals using many RBs (e.g., 75 RBs having RBmid=37) may be transmitted in a reduced transmission power mode without violating emissions standards. Previously, existing techniques limited the maximum number of RBs that could be used in certain situations as illustrated by the flat portion of the No Back Off Region in FIG. 4.

Based on a configuration of rules embodying the diagram in FIG. 4, for example, if the UE 108 receives a grant for a contiguous resource block that occupies a region of the Transmission Bandwidth Configuration where the network restricts UE operation, the UE 108 may, on the initiative of its own rule-based decision process, determine the intended power in the granted resource blocks and back off the power transmitted across the allocated active resource blocks. For example, the back off may be implemented by reducing a maximum configured output power limit (e.g., Pcmax_L=MIN(PEMAX-ΔTc, Ppowerclass-MPR-A-MPR-<restricted region backoff>-ΔTc)) that is compared against an intended transmit power to set an actual transmit power of the UE. If the transmission grant includes active resource blocks of a length Lcrb and positioned toward a channel edge where such excessive emission may occur in a protected band, the grant may be entirely invalid. Invalid grants may occur in cases where the UE 108 may decode a false grant due to poor channel conditions, and this false grant may cause the UE 108 to transmit in a restricted configuration which could potentially lead to excessive emissions in a protected band, for example.

Figure 5:
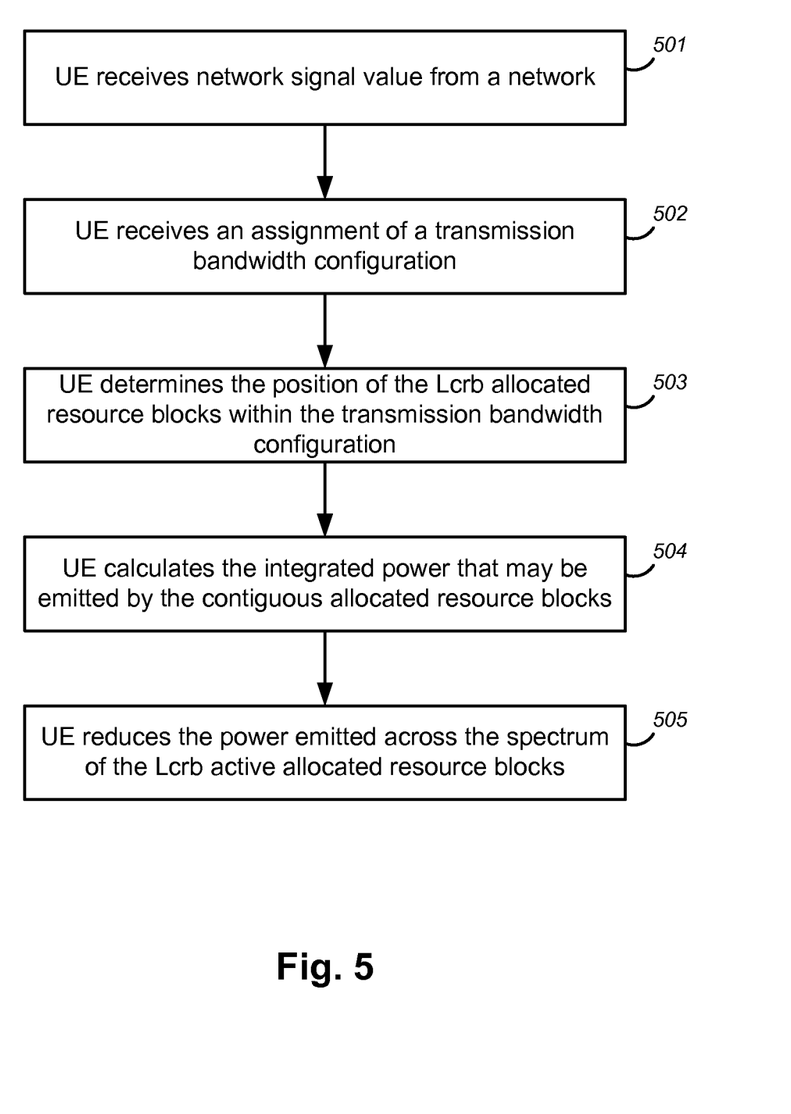
FIG. 5 is an exemplary flow diagram of a method according to one embodiment.

FIG. 5 is an exemplary flow diagram of a method according to one embodiment. FIG. 5 shows a flow diagram of a method of user equipment control of emitted power in a granted group of contiguous resource allocation blocks, for example. A rule-based decision method for limiting power transmission by a UE 108 is now described. At 501, a UE receives a network signal value from a network. This network signal value from a network may be a NS_05 signal, broadcast from a base station of a network to identify a protected band, which is to be respected according to the TS 3GPP standard.

At 502, the UE 108 receives from the network an assignment of a Transmission Bandwidth Configuration, specified by a center subcarrier frequency and bandwidth, a total number of resource blocks available, and an assigned allocation of resource blocks identified, for example, by a starting resource block number (RBstart) and a total number of resource blocks (Lcrb) to constitute the allocated transmission bandwidth available to the UE 108.

At 503, the UE 108 determines the position of the Lcrb allocated resource blocks within the Transmission Bandwidth Configuration of the E-UTRA carrier band, and frequency proximity relationship to the protected band.

At 504, the UE 108 calculates the intended power that may be emitted by the contiguous allocated resource blocks as granted by the network according to the network signal value (e.g., NS_05).

At 505, the UE 108 reduces the power emitted across the spectrum of the Lcrb active allocated resource blocks to an amount that satisfies emission restrictions respecting the protected band. The power may be uniformly scaled across the spectrum defined by the Lcrb active resource blocks, or alternatively, may be individually scaled in power transmission.

The UE 108 may include a receiver to receive the network signal value from the network and grant assignment information regarding the Transmission Bandwidth Configuration. The UE may include a memory (e.g., as described below) to store the network signal value and assignment information, and a program to execute control of power transmission supplemental limitations to back off transmitted power on the basis of the network signal value and grant assignment, a processor to run the program, and a transmission system to transmit uplink signals in the allocated resource blocks at the supplemental power back-off levels.

Figure 6:
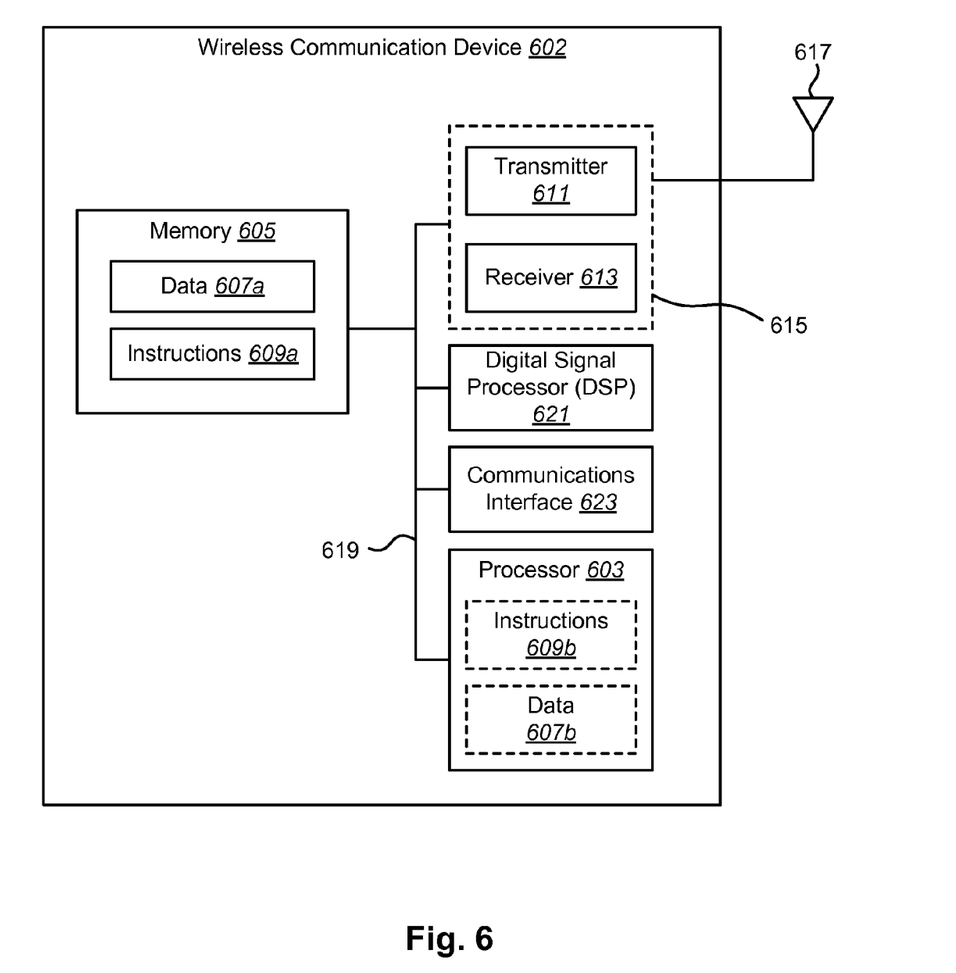
FIG. 6 illustrates a wireless communication device according to an embodiment.

FIG. 6 illustrates a wireless communication device 602 that may incorporate features of the present disclosure. The wireless communication device 602 may be an access terminal, a mobile station, a user equipment (UE), etc. The wireless communication device 602 includes a processor 603. The processor 603 may be a general purpose single- or multi-chip microprocessor (e.g., an ARM), a special purpose microprocessor (e.g., a digital signal processor (DSP)), a microcontroller, a programmable gate array, etc. The processor 603 may be referred to as a central processing unit (CPU). Although just a single processor 603 is shown in the wireless communication device 602 of FIG. 6, in an alternative configuration, a combination of processors (e.g., an ARM and DSP) could be used.

The wireless communication device 602 also includes memory 605. The memory 605 may be any electronic component capable of storing electronic information. The memory 605 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 607a and instructions 609a may be stored in the memory 605. The instructions 609a may be executable by the processor 603 to implement certain aspects of the techniques disclosed herein. Executing the instructions 609a may involve the use of the data 607a that is stored in the memory 605. When the processor 603 executes the instructions 609, various portions of the instructions 609b may be loaded onto the processor 603, and various pieces of data 607b may be loaded onto the processor 603.

The wireless communication device 602 may also include a transmitter 611 and a receiver 613 to allow transmission and reception of signals to and from the wireless communication device 602 via an antenna 617. Transmitter 611 may include a power amplifier incorporating the techniques described herein. The transmitter 611 and receiver 613 may be collectively referred to as a transceiver 615. The wireless communication device 602 may also include (not shown) multiple transmitters, multiple antennas, multiple receivers and/or multiple transceivers.

The wireless communication device 602 may include a digital signal processor (DSP) 621. The wireless communication device 602 may also include a communications interface 623. The communications interface 623 may allow a user to interact with the wireless communication device 602.

The various components of the wireless communication device 602 may be coupled together by one or more buses, which may include a power bus, a control signal bus, a status signal bus, a data bus, etc. For the sake of clarity, the various buses are illustrated in FIG. 6 as a bus system 619.

It is to be understood that the aspects described herein may be implemented in hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

As used in this application, the terms "component," "module," "system," and the like are intended to refer to an electronic circuit, electronic signal processor, and/or computer-related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

Furthermore, various aspects are described herein in connection with an access terminal and/or an access point. An access terminal may refer to a device providing voice and/or data connectivity to a user. An access wireless terminal may be connected to a computing device such as a laptop computer or desktop computer, or it may be a self-contained device such as a cellular telephone. An access terminal can also be called a system, a subscriber unit, a subscriber station, mobile station, mobile, remote station, remote terminal, a wireless access point, wireless terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. An access point, otherwise referred to as a base station or base station controller (BSC), may refer to a device in an access network that communicates over the air-interface, through one or more sectors, with wireless terminals. The access point may act as a router between the wireless terminal and the rest of the access network, which may include an Internet Protocol (IP) network, by converting received air-interface frames to IP packets. The access point also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any non-transitory computer-readable device or medium, for example. As one example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and non-volatile memories including flash memories and devices (e.g., card, stick, key drive . . . ) and other integrated circuit memories such as read-only memories, programmable read-only memories, and electrically erasable programmable read-only memories.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method of limiting a mobile user equipment (UE) transmission power comprising:
    receiving a network signal value from a network indicating presence of a protocol for communications in the network that places one or more restrictions on UE transmissions; and
    reducing a transmission signal power for scheduled transmission on an uplink carrier on the basis of the network signal value, a center frequency of a transmitting channel, a number of allocated resource blocks, and a location of the allocated resource blocks within the channel,
    wherein particular resource blocks occupy a span of frequency, and wherein the protocol specifies resource blocks that are not usable for corresponding lengths of contiguous allocated resource blocks, and wherein reducing the transmission signal power occurs when one of the specified resource blocks that are not usable is scheduled for transmission.

2. The method of claim 1 wherein said reducing is triggered by a rule-based decision process.

3. The method of claim 1 wherein said reducing comprises reducing a maximum configured output power limit.

4. The method of claim 1 wherein reducing the transmission signal power is supplemental to another reduction in transmission signal power that is based on the network signal value but not the location of the allocated resource blocks within the channel.

5. The method of claim 4 wherein said supplemental reducing of the transmission signal power is stored in a non-volatile memory on the UE.

6. The method of claim 4 wherein said supplemental reducing of the transmission signal power is configurable based on characterization measurements of a UE design.

7. The method of claim 4 wherein said supplemental reducing of the transmission signal power is greater than said another reduction in transmission signal power based on the network signal value.

8. The method of claim 1 wherein the UE is configured to transmit resource blocks to a base station in violation of a regional protocol.

9. The method of claim 8 wherein the UE is configured to transmit the resource blocks due to the base station being non-compliant with said regional protocol.

10. The method of claim 8 wherein the UE is configured to transmit the resource blocks due to the UE being non-compliant with said regional protocol.

11. The method of claim 8 wherein the UE is configured to transmit the resource blocks due to a misinterpretation on the UE of a schedule transmitted from the base station to the UE.

12. The method of claim 1 wherein the network signal value is NS_05.

13. The method of claim 1 wherein the UE is operable in a roaming mode to receive the network signal value of NS_05.

14. The method of claim 1 further comprising determining when a scheduled transmission violates the protocol based on the network signal value.

15. The method of claim 1 wherein the one or more restrictions include restricting transmitting signals at particular frequencies.

16. A wireless device comprising:
   a transmitter;
   a receiver; and
   one or more digital processing circuits configured to receive a network signal value indicating presence of a protocol for communications in the network that places one or more restrictions on user equipment (UE) transmissions,
   wherein the network signal value is received from a base station through the receiver, and wherein the digital processing circuits are configured to reduce a transmission signal power in the transmitter for scheduled transmission on an uplink carrier on the basis of the network signal value, a center frequency of a transmitting channel, a number of allocated resource blocks, and a location of the allocated resource blocks within the channel, and
   wherein particular resource blocks occupy a span of frequency, and wherein the protocol specifies resource blocks that are not usable for corresponding lengths of contiguous allocated resource blocks, and wherein reducing the transmission signal power occurs when one of the specified resource blocks that are not usable is scheduled for transmission.

17. The wireless device of claim 16 wherein the UE is configured to transmit resource blocks to a base station in violation of a regional protocol.

18. The wireless device of claim 16 wherein said reducing the transmission signal power is supplemental to another reduction in transmission signal power, wherein said another reduction in transmission signal power is based on the network signal value but not the location of the allocated resource blocks within the channel.

19. A software program stored on a non-transitory computer readable storage medium, which when executed on mobile user equipment (UE), performs the steps for limiting UE transmission power comprising:
   receiving a network signal value from a network indicating presence of a protocol for communications in the network that places one or more restrictions on UE transmissions; and
   reducing a transmission signal power for scheduled transmission on an uplink carrier on the basis of the network signal value, a center frequency of a transmitting channel, a number of allocated resource blocks, and a location of the allocated resource blocks within the channel,
   wherein particular resource blocks occupy a span of frequency, and wherein the protocol specifies resource blocks that are not usable for corresponding lengths of contiguous allocated resource blocks, and wherein reducing the transmission signal power occurs when one of the specified resource blocks that are not usable is scheduled for transmission.

20. The software program of claim 19 wherein the UE is configured to transmit resource blocks to a base station in violation of a regional protocol.

21. The software program of claim 19 wherein said reducing the transmission signal power is supplemental to another reduction in transmission signal power, wherein said another reduction in transmission signal power is based on the network signal value but not the location of the allocated resource blocks within the channel.

* * * * *